(No Model.) 2 Sheets—Sheet 1.
S. GREEN.
TIRE.
No. 504,032. Patented Aug. 29, 1893.
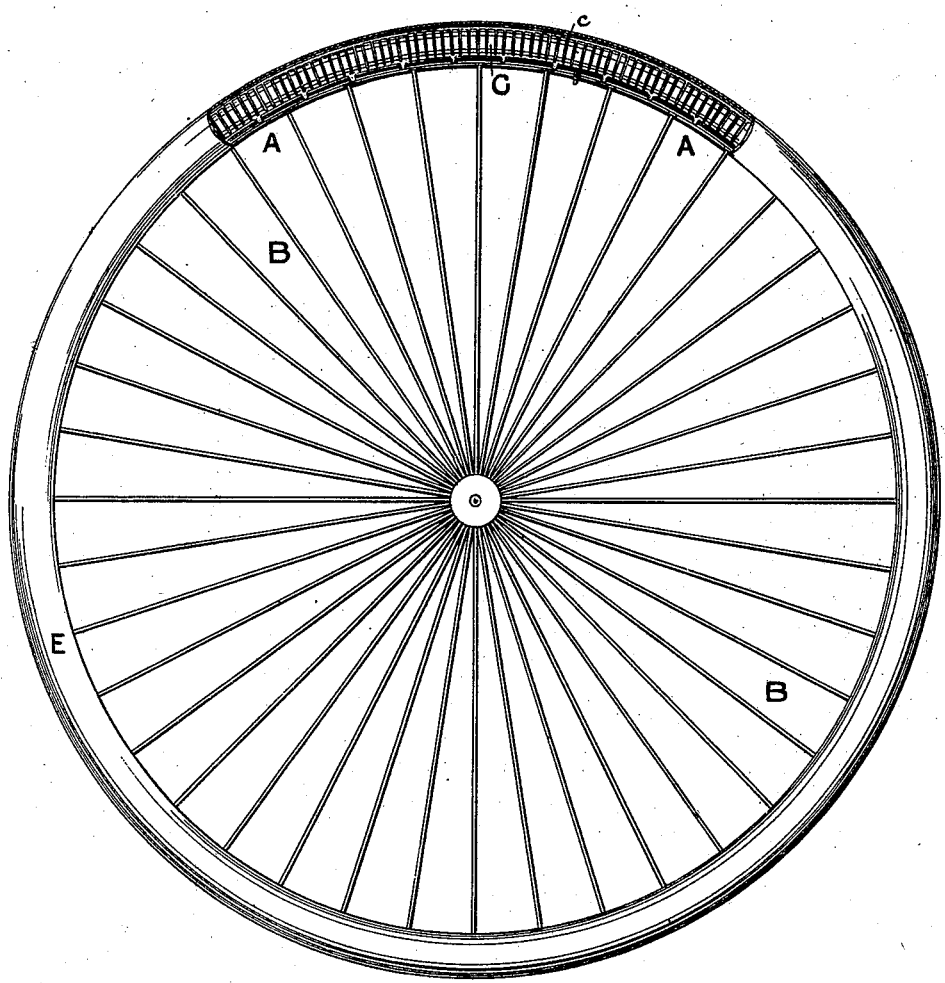
FIG. I.
WITNESSES
Chas Ovendale
Joseph Bates.
INVENTOR
Squire Green
by Thompson Thompson & Co
attys

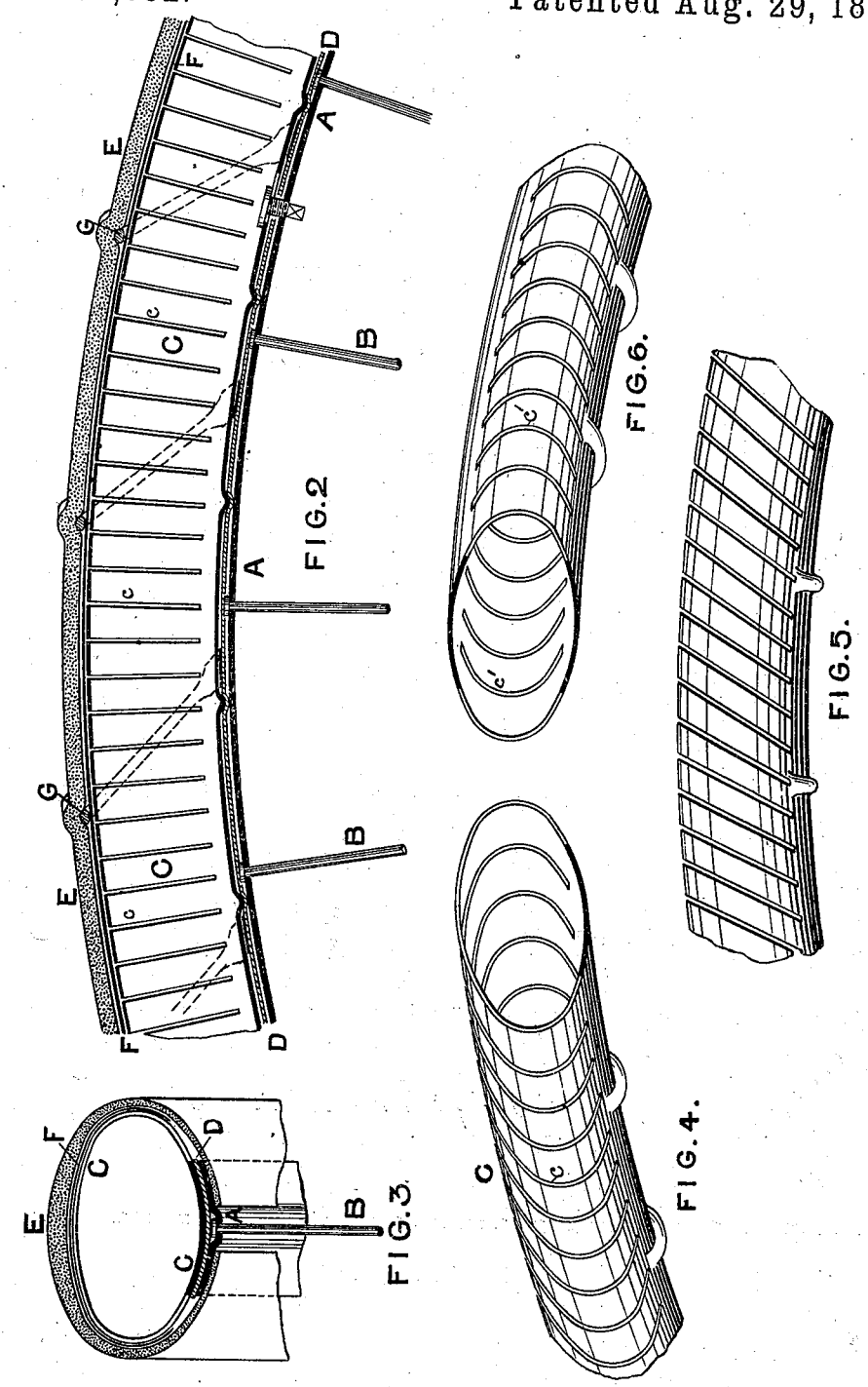

UNITED STATES PATENT OFFICE.

SQUIRE GREEN, OF STRETFORD, ENGLAND.

TIRE.

SPECIFICATION forming part of Letters Patent No. 504,032, dated August 29, 1893.

Application filed May 29, 1893. Serial No. 475,909. (No model.)

*To all whom it may concern:*

Be it known that I, SQUIRE GREEN, a subject of the Queen of Great Britain, residing at Stretford, in the county of Lancaster, England, have invented certain new and useful Improvements in Tires, of which the following is a specification.

The object of this invention is to provide a steel cushion tire for bicycles, tricycles, and other light vehicles which while securing a high degree of elasticity and resilience will avoid the defects of the pneumatic tire and other tires constructed with steel springs.

It consists essentially in constructing the tire of a hollow thin steel tube divided into a number of transverse sections by a series of slits or slots cut transversely preferably covered with any suitable material.

It will be fully described with reference to the accompanying drawings in which as an example a wheel for a bicycle is illustrated.

Figure 1, is a front elevation of wheel partly in section. Fig. 2, is a longitudinal sectional elevation of part of the wheel. Fig. 3, is a transverse sectional elevation. Fig. 4, is a perspective view of tire. Fig. 5, is an elevation showing modified form of slits or slots. Fig. 6, is a perspective view of another modification.

The wheel is constructed with a rim A and spokes B of any ordinary construction.

The tire C is a thin tube bent to the required shape to fit the rim A. It is constructed of thin steel preferably weldless and in cross section oval or egg shaped to give the desired lateral strength and to more efficiently distribute the bending strain. To give the required degree of resilience to the tire I cut transversely around its periphery a number of slits or slots $c$ at short intervals thus dividing the tire throughout its length into a number of narrow steel springs leaving the tire intact along the bottom; or if desired the slits may be cut only at each side as at $c'$ Fig. 6, leaving the tire intact both top and bottom. The slits may either be radial or slightly inclined as in Fig. 5.

It is preferable to make the tire from a weldless tube but it is not essential that the tire should be completely tubular as it may be open or the edges unconnected at the under side where they bear upon the rim. The tire thus constructed is then finely tempered to give a large degree of elasticity and resilience. The tire may be made in one piece the size of the wheel or may be made in any desired number of sections to render it more easily repaired in case of a fracture of any part of it through accident. In applying the tire to the wheel it may be affixed to the rim by rivets, screws or other device and is preferably laid on a piece of felt, or other soft material D interposed between it and the rim, and is covered with an outside tread or cover E of rubber, canvas, or other elastic material for the purpose of protecting it and of presenting a non-skidding surface to the ground. Between the outside tread or cover E I also prefer to insert a piece of flexible material F such as raw hide or leather to prevent any wearing or cutting action on the rubber tread E. The rubber or other tread E may be secured in position by lacing, cement or any other well known device. To prevent slipping or skidding a band of material G may be wound between the steel tire and the outer rubber tread to present a number of projections or irregularities on the outer surface. I consider that by this construction I obtain a durable, elastic, resilient tire, not liable to be easily damaged and one that will not present the disadvantage that some other spring tires do of catching and lifting the mud of the road or of offering a great resistance in its motion through the air.

What I claim as my invention, and desire to protect by Letters Patent, is—

1. A steel tire for bicycles and other vehicles constructed of tubular or hollow form divided into a number of narrow transverse sections by a series of transverse slits or slots around the periphery substantially as described.

2. A tire for bicycles and other vehicles constructed of a hollow steel tube of oval or egg shape with a number of slits or slots cut transversely to give the desired amount of elasticity and resilience and a suitable covering of rubber, canvas or other material substantially as described and shown.

3. In a tire for bicycles and other vehicles the combination of a tubular tire divided into a number of sections by transverse slits or slots with an outer tread and covering of rubber an intermediate protecting covering of a hard flexible material and a strip of hard material wound round under the cover to produce projections thereon substantially as described.

In testimony whereof I have signed my name to this specification in the presence of two subscribing witnesses.

SQUIRE GREEN.

Witnesses:
J. OWDEN O'BRIEN,
CHAS. OVENDALE.